(12) United States Patent
Long (10) Patent No.: US 6,416,846 B2
(45) Date of Patent: Jul. 9, 2002

(54) COMPOSITE MATERIAL AND MANUFACTURING METHOD THEREOF

(75) Inventor: Than Trong Long, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/858,040

(22) Filed: May 16, 1997

(30) Foreign Application Priority Data

May 17, 1996 (JP) .............................. 8-123145

(51) Int. Cl.⁷ .............................. B32B 7/04; B32B 5/00
(52) U.S. Cl. ...................... 428/209; 428/615
(58) Field of Search .................. 428/615, 209

(56) References Cited

U.S. PATENT DOCUMENTS

| | | | | |
|---|---|---|---|---|
| 2,051,373 A | * | 8/1936 | Fitzgerald | 154/2 |
| 2,976,093 A | * | 3/1961 | Reiling | 308/238 |
| 3,705,450 A | * | 12/1972 | Morisaki | 419/9 |
| 3,818,564 A | * | 6/1974 | Tsuya et al. | |
| 3,899,227 A | * | 8/1975 | Harig | 308/237 R |
| 4,000,982 A | * | 1/1977 | Ueda | 428/551 |
| 4,208,472 A | * | 6/1980 | Cho et al. | 428/550 |
| 4,238,137 A | * | 12/1980 | Furchak et al. | 308/3 R |
| 4,312,822 A | * | 1/1982 | Bonnet | 264/112 |
| 4,482,399 A | * | 11/1984 | Morishita et al. | 148/31.5 |
| 4,732,818 A | * | 3/1988 | Pratt et al. | 419/9 |
| 4,857,411 A | | 8/1989 | Yamaguchi et al. | 428/546 |
| 5,300,366 A | * | 4/1994 | Nakamaru et al. | 428/549 |
| 5,447,774 A | * | 9/1995 | Tanaka et al. | 428/553 |

FOREIGN PATENT DOCUMENTS

| | | |
|---|---|---|
| GB | 1 308 011 | 2/1973 |
| JP | 62-64527 | 3/1987 |
| JP | 64-32856 | 2/1989 |
| JP | 2-248531 | 10/1990 |
| JP | 7-187287 | 7/1995 |
| JP | 8-224805 | 9/1996 |

OTHER PUBLICATIONS

Chilton Book Company, "Repair & Tune–Up Guide," Ford Pick–Ups 1965–1986.*

* cited by examiner

Primary Examiner—Daniel J. Jenkins
(74) Attorney, Agent, or Firm—Finnegan, Henderson, Farabow, Garrett & Dunner, L.L.P.

(57) ABSTRACT

A composite material has plate 4 having holes and a bonded to a first member to form an intermediate layer, and a second member which is made of a material different from the first member 1 laminated onto the intermediate layer 2 while charging a portion of the second member 5 into the holes 3 of the intermediate layer 5 to form a composite material 6. The holes 3 of the plate 4 which forms the intermediate layer 2 have a shape in such that the charged second member exerts a resisting force against a tensile stress applied in a direction perpendicular to the surface of the first member 1, e.g., a shape having a first hole opened on the side of the second member and a second hole communicated with the first hole and having a space not overlapped with the first hole, or a shape that an opened area on the side of the second member is smaller than that on the side of the first member.

13 Claims, 5 Drawing Sheets

COMPOSITE MATERIAL AND MANUFACTURING METHOD THEREOF

BACKGROUND OF THE INVENTION

1. Field of the Invention

The invention relates to a composite material between different types of members, a method for producing it, and a sliding material made of the composite material.

2. Description of the Related Art

With the development of industrial technologies in these years, demands are increasing for a material which provides a plurality of functions which cannot be provided by a single material, e.g., a composite material which is produced by laminating and bonding two materials having different properties. To produce a composite material by combining two different types of metal materials, a hot rolling method (e.g., cladding) or a liquid metal solidifying method (e.g., a casting method) can be applied. And, a relatively good bond strength can be obtained by such a manufacturing method.

Demands for the properties of a compound material are increasing in complexity, and there is a demand for combining different materials, e.g., a metal material and a resin material. But, the production of a composite material by laminating a metal material and a resin material has a disadvantage that it is difficult to obtain a sufficient bond strength by a complex method which has been used to produce a composite material of metal materials. Specifically, when different metal materials are bonded by a liquid metal solidifying method, a diffusional reaction takes place because the metal materials are mutually bonded, causing mechanical bonding and physical or chemical bonding. But, when a metal material and a resin material are bonded, it is very hard to obtain a satisfactory bond strength because a chemical bond effect is not obtained between the metal material and the resin material.

When a metal material and a resin material are bonded under conditions of a high temperature and a high pressure, a stress is caused on a bonded interface due to a difference of coefficient of thermal expansion between these materials and they must be kept under such conditions for a long duration, resulting in disadvantages of increasing the production cost or the like.

When a composite material is made of a metal material and a resin material, an adhesive may be used to bond them. But, it is not easy to choose an appropriate adhesive which has good adhesive properties for both metal and resin materials, and since a resin-based adhesive has a metal-resin bonded interface, a bond strength between the metal material and the resin material cannot be improved basically. And, as a method to improve an interface strength when two types of members are bonded, it is known to increase a bonded area by enlarging the surface area by honing or chemical etching. But, the increase of a bonded area by honing or chemical etching is limited, and a resistance against a shearing breakaway of the interface and a tensile stress in a perpendicular direction to the bonded interface is small, so that a bond strength between different types of materials cannot be enhanced sufficiently.

As described above, in the case of a conventional composite material and a method for manufacturing it, when different materials such as a metal material and a resin material are mutually laminated and bonded, a sufficient bond strength cannot be obtained. And, the resin material is deteriorated, and the production cost is increased.

Therefore, a composite material which is produced by combining different types of materials such as a metal material and a resin material is demanded to have improved reliability between the different types of materials by improving a bond strength between the different types of materials without involving deterioration of the resin material or degradation of the strength of the composite material itself.

SUMMARY OF THE INVENTION

The present invention has been completed to remedy the above-described disadvantages and aims to provide a composite material which can improve a bond strength between different types of materials without involving deterioration of a resin material or degradation of the strength of the composite material itself.

A first composite material of the invention comprises a first member formed of a first material, an intermediate layer formed of a plate which is bonded to the first member and has a plurality of holes, and a second member formed of a second material different from the first member, wherein the second material is charged into the holes of the plate which forms the intermediate layer, and the holes in which the second material is charged have a shape to exert the resistance of the charged second material against a tensile stress applied in a direction perpendicular to the bonding surface of the first member.

And, each of the holes formed in the plate which forms the intermediate layer has a first opening on the side of the first member and a second opening on the side of the second member to communicate with the first opening, and forms a stepped passage which has a stepped portion formed by an overlapped area of the hole of the first member and the plate of the second member.

The second opening of the first composite material has an area smaller than that of the first opening.

Further, the plate which forms the intermediate layer has the communicating stepped passages each of which is formed of the second hole and the first hole having a larger diameter than the second hole and formed in a stepped shape in cross section by the first hole and the second hole.

More further, the plate is a bonded material of a first plate having the first holes and a second plate having the second holes with a diameter smaller than that of the first holes which are bonded with the second holes and the first holes aligned.

Or the plate is a bonded material of a first plate having the first holes and a second plate having the second holes with a diameter substantially the same as that of the first holes which are bonded with the first holes and the second holes partly overlapped. And, this bonded material has the first holes and the second holes in multiple numbers partly overlapped.

And, in the first composite material of the invention, the first member is made of a metal material, and the second member is one member selected from a group consisting of a resin material, a rubber material, and a glass material which have a hardening temperature lower than the melting point of the metal material.

A second composite material of the invention is a composite material comprising a first member, an intermediate layer formed of at least one layer bonded to the first member and having a large number of holes, and a second member formed on the intermediate layer, wherein the second member is made of a material different from the first member, and the material which forms the second member is charged into the holes of the intermediate layer. In this composite material, the intermediate layer comprises at least one structural member selected from a group consisting of a granular metal material and a fibrous metal material, and this structural member is formed into a three-dimensional network having voids by having the granular metal material and the fibrous metal material diffusion bonded partly and/or partly bonded by a metal having a melting point lower than that of a metal configuring the structural member.

The structural member which forms the second composite material has a porosity of 10% to 70%.

The granular metal material is spheres having an average diameter of 0.001 to 10 mm. And, the fibrous metal material is a cylindrical material having an average diameter of 0.001 to 10 mm.

In the second composite material, the first member is an Fe-based metal material, and the second member is one member selected from a group consisting of a resin material, a rubber material, and a glass material. The intermediate layer is at least one structural member selected from a group consisting of a granular metal material and a fibrous metal material, and this structural member is formed into a network structure having transmission holes which are formed of voids in the structural member by being bonded by a metal having a melting point lower than that of a metal mutually and partly configuring the structural member.

A method for producing a composite material of the invention, when the composite material is produced by laminating a first member and a second member formed of a material different from the first member, has a step to bond to the first member a member having holes which vary in stages or communication holes which make a detour to exert a resisting force against a tensile stress in a direction perpendicular to the surface of the first member to form an intermediate layer, and a step to laminate the second member to the first member while charging a portion of the second member into the transmission holes of the member which forms the intermediate layer.

In the composite material and the method for producing the composite material of the invention, it is particularly preferable that a metal material is used as the first member, and the second member is one member selected from a group consisting of a resin material, a rubber material, and a glass material which have a hardening temperature lower than the melting point of the metal material.

In the composite material and the method for producing the composite material of the invention, the intermediate layer in which a portion of the second member is charged is formed by bonding a member which has openings opened to the side of at least the second member to the first member, so that the strength of the intermediate layer itself and the bond strength between the first member and the intermediate layer can be improved. In addition, since the voids in which the second member is charged is formed of the holes, the voids charged with the second member can be formed in a large size. In other words, an amount of the second member charged into the intermediate layer can be increased.

And, the holes have a shape in such that the charged second member in the holes exert a resisting force against a shearing stress in a direction parallel to a bonded interface with the first member and a tensile stress in a direction perpendicular to the surface of the member, e.g., a shape having second openings which are formed on the side of the second member and first openings which have a space not overlapping with the second openings, or a shape having openings on the side of the second member with an area smaller than that of the openings on the side of the first member. The structural member is at least one member selected from a granular metal material and/or a fibrous metal material, and the structural member is formed into a three-dimensional network structure having voids of roundabout passages by being bonded mutually and partly by a metal having a melting point lower than that of a metal configuring the component member. Thus, when a resin material or a glass material is used for the second material, a bond strength of these materials to the first member can be enhanced, and reliability of the composite material between different types of materials can be improved remarkably.

BRIEF DESCRIPTION OF THE DRAWINGS

FIG. 2A and FIG. 2B illustrate one embodiment of the intermediate layer of the composite material shown in FIG. 1.

FIG. 3A, FIG. 3B and FIG. 3C illustrate another embodiment of the intermediate layer of the first composite material shown in FIG. 1.

FIG. 5A and FIG. 5B illustrate still another embodiment of the intermediate layer of the first composite material shown in FIG. 1.

DESCRIPTION OF THE PREFERRED EMBODIMENTS

Embodiments of the invention will be described with reference to the accompanying drawings.

Figure 1:
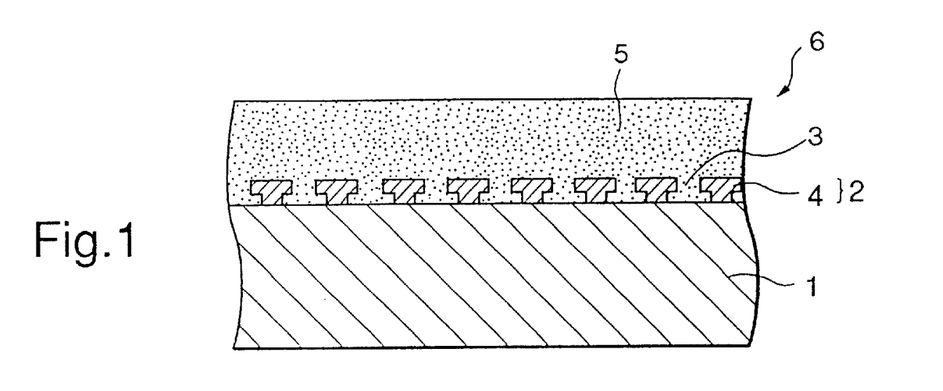
FIG. 1 is a sectional view showing schematically the structure of the first composite material according to one embodiment of the invention.

FIG. 1 is a sectional view showing schematically the structure of the first composite material according to one embodiment of the invention. In the drawing, reference numeral 1 denotes a first member which is one of the component members of the composite material, and an intermediate layer 2 is formed on the first member 1. A first material for the first member 1 is not specifically limited and may be various types of metal materials.

The intermediate layer 2 formed on the first member 1 is formed of one or two or more plates 4 having a plurality of holes 3 which are formed from the side of the first member 1 to the other side (the side of a second member 5 to be described afterwards). This plate 4 is bonded to the surface of the first member 1 to form the intermediate layer 2.

When the first material for the first member 1 is a metal material, the plate 4 which forms the intermediate layer 2 is preferably the same metal material. And, it is particularly preferable to use the metal material having properties such as an approximate coefficient of thermal expansion. Specifically, when the first member 1 is steel, the plate 4 is also steel or an iron-based alloy or the like. The plate 4 which forms the intermediate layer 2 is not limited to have a particular thickness and it is preferably determined to have a thickness of about 0.01 mm to 100 mm though variable depending on the material or thickness of the first member 1 or a second member 5 to be described afterwards.

And, the hole 3 can be formed to be circular, oval, rectangular, or various other shapes in cross section. Besides, the holes 3 may be determined to have a size or a formation pitch so that a bond strength between the first member 1 and the second member 5 can be kept satisfactorily by the material, thickness and the like of the first member 1 and the second member 5, and selected from a range of several ten $\mu$m to several ten mm as required. The holes 3 are not required to be formed orderly and may be formed disorderly, but it is desirable to form the holes 3 orderly to improve uniformly the bond strength of the first member 1 and the second member 5 as a whole.

Besides, the plate 4 which forms the intermediate layer 2 is bonded to the first member 1 with a substance having a low melting point lower than that of the plate 4 or a substance which can produce a substance having a low melting point (hereinafter inclusively called the low-melting point bonding material) held between them. When the plate 4 is made of a metal material, the low-melting point bonding material is a metal material having a melting point lower than that of the plate 4 or a metal material which reacts with the plate 4 to produce a substance (such as an alloy) having a low melting point. Such a low-melting point substance may be a material which works as so-called brazing material. Specifically, when the plate 4 is an iron-based material, there may be used copper, its alloy, aluminum, its alloy or the like.

Within the holes 3 of the plate 4 which forms the intermediate layer 2, a second material which forms the second member 5 different from the material of the first member 1 is charged, and the second member 5 is laminated on the first member 1. In other words, when the first member 1 and the second member 5 are mutually bonded, the intermediate layer 2, which is formed on the first member 1 and partially charged with the second member 5, is held between them. In this combination, a composite material 6 is formed.

As the second material for the second member 5, a material different from the first member 1 can be used, and the present invention is suitable to use, for example, a resin material, a rubber material, a glass material or the like which is low in bonding ability with the metal material for the first member 1 and has a low strength. The invention is particularly suitable to use as the second member 5 a resin material, a rubber material, a glass material or the like which has a hardening temperature lower than the melting point of the metal material for the first member 1. And, a specific material is selected in accordance with the properties required for the composite material.

And, when a resin material or a rubber material is used as the second material for the second member 5, the hardening temperature means its thermosetting temperature or softening/hardening temperature; when a glass material is used, its melting (or fluidizing)/hardening temperature or the like.

The holes 3 of the plate 4 which forms the intermediate layer 2 have a shape so as to exert the resistance of the charged second material in the holes, resistant against a tensile stress in a direction perpendicular to the surface of the first member 1. When a tensile stress (a peel force) acts to separate the second member 5 and the intermediate layer 2 which has the holes 3 charged with the second material forming the second member 5, the holes 3 which have a resistance force against the tensile stress exert a wedge effect, thereby enhancing a bond strength between the second member 5 and the first member 1. Examples of these holes 3 are as follows.

(1) A transmission hole having a second opening which is formed on the side of the second member and a first opening which is communicated with the second opening and has an area not overlapping with the second opening.

(2) A hole that a second opening on the side of the second member is smaller than a first opening on the side of the first member.

(3) A hole passage having a network structure which is formed of the spaces in the intermediate layer forming member.

As described above, in the composite material 6 of this embodiment, the intermediate layer 2 charged with the second material which forms the second member 5 is formed by bonding the plate 4 having the holes 3 onto the first member 1, so that a strength of the intermediate layer 2 itself and a bond strength between the first member 1 and the intermediate layer 2 can be improved. In addition to the improvement of the bond strength, since the spaces in which the second material for the second member 5 are formed of the holes 3, these spaces can be made large.

Thus, the second material can be charged in a sufficient amount into the intermediate layer 2. In addition, since the holes 3 are formed into the shape such as the above exemplified (1), (2) or (3) to exert the resistance of charged second material against the tensile stress, when a resin material or a glass material is used for the second member 5, its bond strength to the first member 1 can be enhanced, and reliability of the composite material 6 formed of different materials can be improved to a large extent.

For example, when a resin material is used as the second material for the second member 5, the resin material can be readily charged in a large amount into the intermediate layer 2 (namely, the transmission holes 3). Therefore, a sufficient bond strength can be obtained by charging a powdered resin material in the cold, applying a pressure, and thermosetting. Differing from conventional pressurizing and impregnating at a high temperature, the resin material is not deteriorated in the above process, and the second member 5 can be obtained to possess the inherent properties of the resin material.

The plate 4 which is provided with the holes 3 having a shape in such that the charged second member in the holes resists against the tensile stress is satisfactory if it has the above functions. Therefore, it is not limited to an ordinary plate having holes, but may be a plurality of meshed materials which are bonded one another with the meshes not fully aligned. Within the holes 3 of the plate 4 which forms the intermediate layer 2, the second material which forms the second member 5 different from the material of the first member 1 is charged.

Now, the plate 4 with the holes 3 having a resistance against the tensile stress described above will be described in detail with reference to FIG. 2A, FIG. 2B, FIG. 3A to FIG. 3C, FIG. 4, FIG. 5A and FIG. 5B.

Figure 2A:
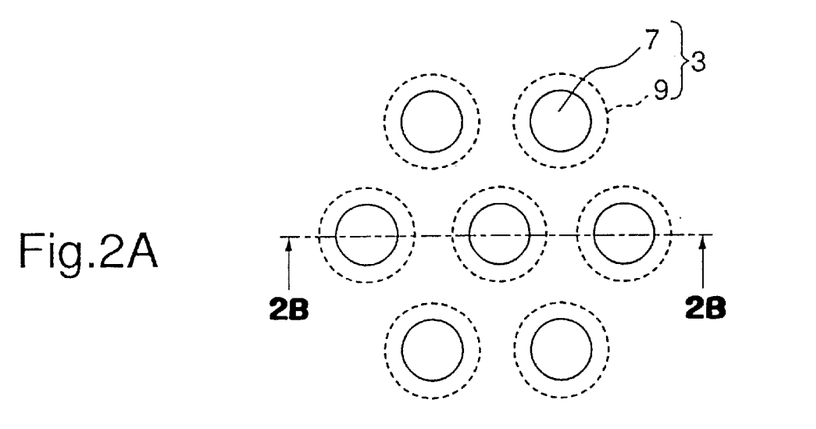
FIG. 2A is a plan view and FIG. 2B is a sectional view taken on line A—A of FIG. 2A.
Figure 2B:
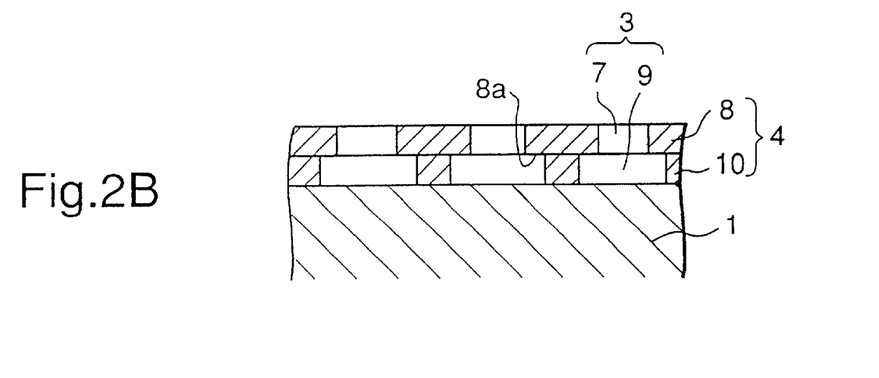

First, the transmission holes referred to in the above (1) will be described specifically. The plate 4 which forms the intermediate layer 2 shown in FIGS. 2A and 2B is made of a bonding plate formed by bonding a first plate 8 which has first circular holes 7 formed in a 60-degree staggered arrangement and is positioned on the side of the second member 5 and a second plate 10 which has second circular holes 9 formed in the same pattern and pitch as the first holes 7 but having a diameter larger than that of the first holes 7 and is positioned on the side of the first member 1 with the centers of the first holes 7 substantially aligned with those of the second holes 8. And, the plate 4 formed of this bonding plate is bonded onto the first member 1 to form the intermediate layer 2. To bond the first plate 8 and the second plate 10, the above-described low-melting point bonding material is used, and this is also applied to the following descriptions.

The first hole 7 and the second hole 9 form a stepped hole with its lower half having a large diameter on the side of the first member 1. This stepped hole is also equivalent to the holes referred to in the above (2). The hole 3 thus formed has a large diameter on the side of the first member 1 to form a space in the second hole 9 which does not overlap with the first hole 7, and the pertinent part exerts a resistance against a tensile stress, thereby enhancing the bond strength of the second member 5 to the first member 1. In other words, a lower face 8a of the first plate 8 around the first hole 7 lying on top of the second hole 9, namely a terrace area of the stepped hole formed of the first hole 7 and the second hole 9 exerts a resisting force against a tensile stress.

And, these plates 8 and 10 can be a plate having the holes 7 and 9 formed by etching or machining such as punching, and punching plates having a different hole diameter can be used. And, this is also applied to the following descriptions.

By using the plate 4 which is formed of the bonded plate consisting of the first plate 8 and the second plate 10, the second hole 9 which exerts a resisting force of the charged second member against a tensile stress and has a space not overlapping with the first hole 7 can be obtained easily. And, since the second hole 9 having a space which does not overlap with the first hole 7 can be formed uniformly with ease, the bond strength between the first member 1 and the second member 5 can be made uniform. Namely, separation or degradation of properties due to partial lowering of the bond strength can be prevented.

FIG. 2 shows that the first plate 8 and the second plate 10 are mutually bonded so that the center of the first hole 7 is substantially aligned with the center of the second hole 9. But, there may be used various types of bonded materials which are formed by bonding the first plate 8 and the second plate 10 with the center of the first hole 7 and the center of the second hole 9 not aligned, by bonding the first plate 8 and the second plate 10 with the first hole 7 and the second hole 9 partly overlapped, and by bonding three or more plates to form stepped holes having multiple steps. Specifically, a bonded plate which is formed by bonding the first plate 8 and the second plate 10 with the first hole 7 and the second hole 9 partly overlapped can be used, but the hole shape shown in FIG. 2 is desirable because the second member 5 can be charged easily and the resisting force is uniform against a tensile stress from any directions.

And, in the above embodiment, the stepped hole having a large diameter on the side of the first member 1 was formed by bonding the plates 8 and 10 having the holes 7 and 9 with a different diameter. But, this stepped hole can also be formed by etching on both sides of a single plate, and the same effect as described above can be obtained.

Now, description will be made of another embodiment of the holes referred to in the above (1). The plate 4 which forms the intermediate layer 2 shown in FIGS. 3A, 3B and 3C is made of a bonded material formed by bonding a first plate 8 which has first circular holes 7 formed in a 60-degree staggered arrangement and disposed on the side of the second member 5 and a second plate 10 which has second holes 9 formed in a 60-degree staggered arrangement at the same pitch but 180 degrees inverted from the first holes 7 with the centers of the first holes 7 substantially aligned with the centers of gravity of the positions where the second holes 9 are formed.

In other words, the first holes 7 are arranged to overlap three second holes 9 which are arranged to form a regular triangle, and communicated with these three second holes 9. Namely, the second holes 9 are arranged below the area connecting three first holes 7 which are arranged to form a regular triangle, and this area forms a bridge structure, and a lower face 8a corresponding to the bridge of the first plate 8 exerts a resisting force against a tensile stress. A hole 3 formed in this way has a space where three second holes 9 do not overlap with a single first hole 7. Conversely, a single second hole 9 forms the space which does not overlap with the three first holes 7, so that a state of the second member 5 charged into the holes 3 is complex and uniform. Thus, a bonding force of the second member 5 to the first member 1 can be enhanced more uniformly.

By using the plate 4 formed of a bonded plate consisting of the first plate 8 and the second plate 10 described above, the second hole 9 which exerts a resisting force of the charge second material into the hole against a tensile stress and has a space not overlapping with the first hole 7 can be obtained easily in the same way as the above embodiment, and the production cost of the composite material 6 can be reduced. And, since a plurality of first holes 7 are overlapped with a plurality of second holes 9, the bonding force between the first member 1 and the second member 5 can be further improved and made uniform.

Figures 3A, 3B, 3C:
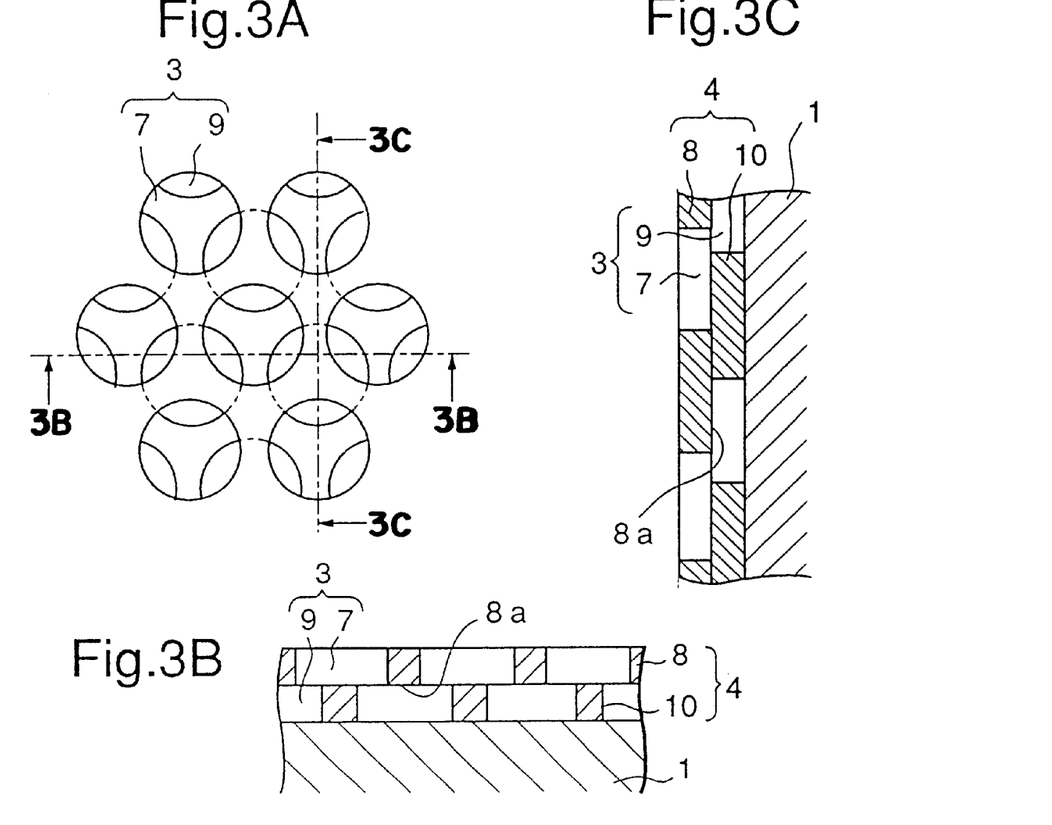
FIG. 3A is a plan view.
FIG. 3B is a sectional view taken on line A—A of FIG. 3A.
FIG. 3C is a sectional view taken along line B—B of FIG. 3A.
Figure 4:
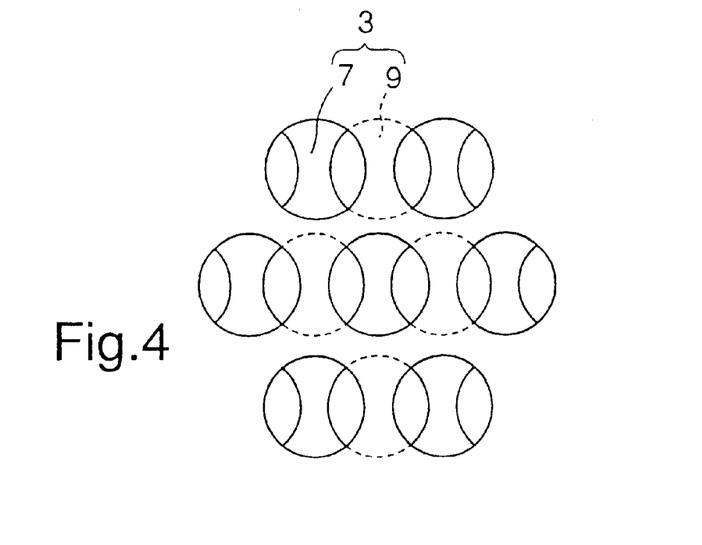
FIG. 4 is a sectional view showing schematically the structure of still another first composite material according to another embodiment of the invention.

FIGS. 3A, 3B and 3C show that the first plate 8 and the second plate 10 are mutually bonded so that the center of the first hole 7 is substantially aligned with the center of gravity of the area where the second holes 9 are formed. But, as shown in FIG. 4, there may be used various bonded materials which are formed by bonding, for example, the first plate 8 and the second plate 10 with the first holes 7 and the second holes 9, which are formed to have the same diameter in the same pattern (not limited to the 60-degree staggered arrangement shown in FIG. 4 but also a square pattern) and with the same pitch, displaced by a ½ pitch. The bonded plate shown in FIG. 4 forms an unoverlapped space by two second holes 9 with respect to one first hole 7. Conversely, the unoverlapped space is formed by one second hole 9 with respect to two first holes 7. Namely, it is possible to use a bonded material which is formed by bonding the first plate 8 and the second plate 10 with the first holes 7 and the second holes 9, which are formed in the same pattern and having substantially the same diameter, overlapped in multiple quantity. But, the bonded plate formed as shown in FIG. 3 is particularly preferable because a more uniform resisting force is obtained.

According to the present invention, it is also possible to use a bonded plate which has an unoverlapped space formed by a single second hole 2 having substantially the same diameter with respect to a single first hole. But, as shown in FIGS. 3A, 3B and 3C and FIG. 4, it is desirable that a higher resisting force can be obtained by forming the unoverlapped space by the plurality of second holes 9 with respect to the single first hole 7.

Now, description will be made of the holes referred to in the above (2). A plate 4 forming the intermediate layer 2 shown in FIGS. 5A and 5B has a truncated cone-shaped hole 3 which is formed to have on the side of the first member 1 an opening 3*b* which is larger than an opening 3*a* on the side of the second member 5. And, the plate 4 is bonded to the first member 1 to form the intermediate layer 2. This truncated cone-shaped hole 3 as a whole exerts a resisting force against a tensile stress to enhance a bond strength of the second member 5 to the first member 1.

Figure 5A:
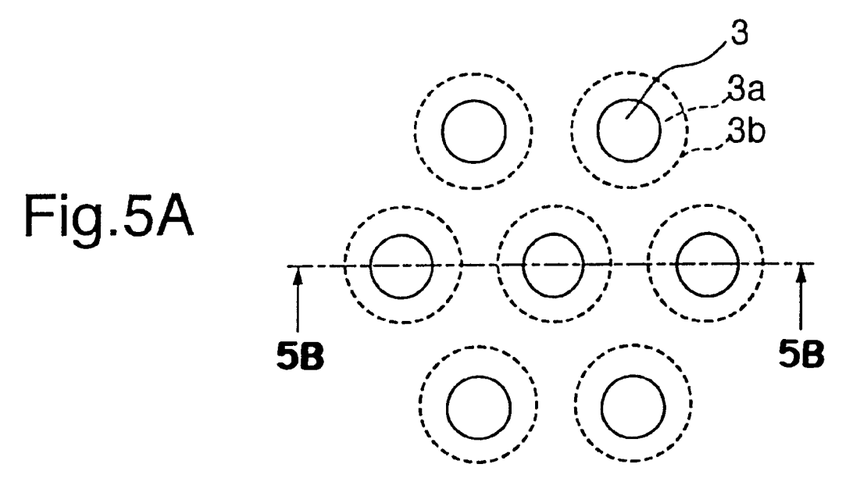
FIG. 5A is a plan view.
Figure 5B:
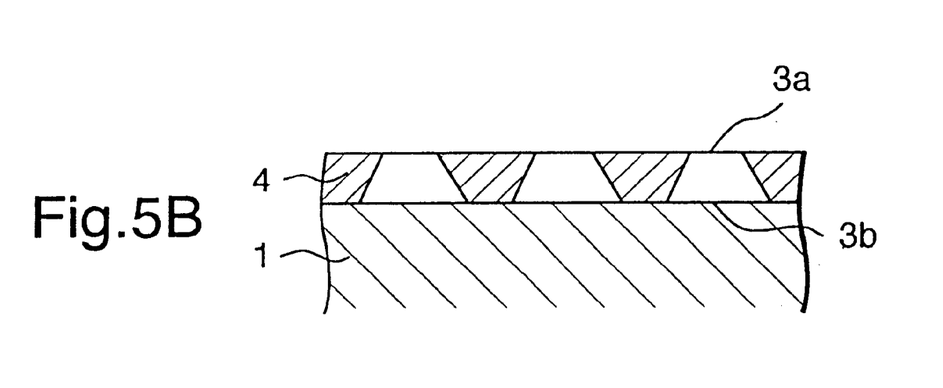
FIG. 5B is a sectional view taken on line A—A of FIG. 5A.

By using the plate 4 having the truncated cone-shaped holes 3, the resisting force against a tensile stress can be obtained by the holes 3 as a whole, and the bond strength between the first member 1 and the second member 5 can be improved and made uniform.

The resisting force against the tensile stress may be obtained by the holes as a whole as shown in FIGS. 5A and 5B, but it is more desirable to obtain the resisting force by the holes having the faces exerting the resisting force as shown in FIG. 2 to FIG. 4, so that the first member 1 and the second member 5 can be bonded by a higher strength with reliability.

The composite material 6 described in the above embodiment can be produced as follows. First, the plate 4 having various shapes described above is laminated on the surface of the first member 1 with the low-melting point bonding material between them. Heat is applied at a temperature corresponding to the low-melting point bonding material used to bond the plate 4 and the first member 1, thereby forming the intermediate layer 2 bonded to the first member 1.

Now, the second member 5 is laminated on the first member 1 while it is being charged into the holes 3 of the plate 4 forming the intermediate layer 2. This laminating method includes a method that a powdered material for the second member 5 is charged into the pores 3 of the intermediate layer 2 under pressure and heat is applied for hardening, and a method that a melt or solution of the material forming the second member 5 is impregnated.

To heat to harden the above-described powdered material, softening and impregnating or melting and impregnating can also be employed. But, the present invention can have each hole 3 in a relatively large size in the intermediate layer 2 and can charge the powdered material in a large amount easily. Therefore, a satisfactory bond strength can also be obtained by ordinary pressurized-charging and thermosetting processes. And, this is particularly effective when a resin material is used for the second member 5, and it can be prevented from being degraded.

In the above embodiment, description has been made of the composite material which is formed by laminating the second member 5 made of a resin material, a rubber material or a glass material onto the first member 1 made of a metal material or the like. But, the respective members which form the composite material of the present invention are not limited to those described above. For example, a ceramics material or glass material can be used for the first member 1, and a metal material, a resin material or a rubber material can be used for the second member 5. To use a ceramics material or a glass material for the first member 1, the plate to be used may be made of the same material.

Figure 6A:
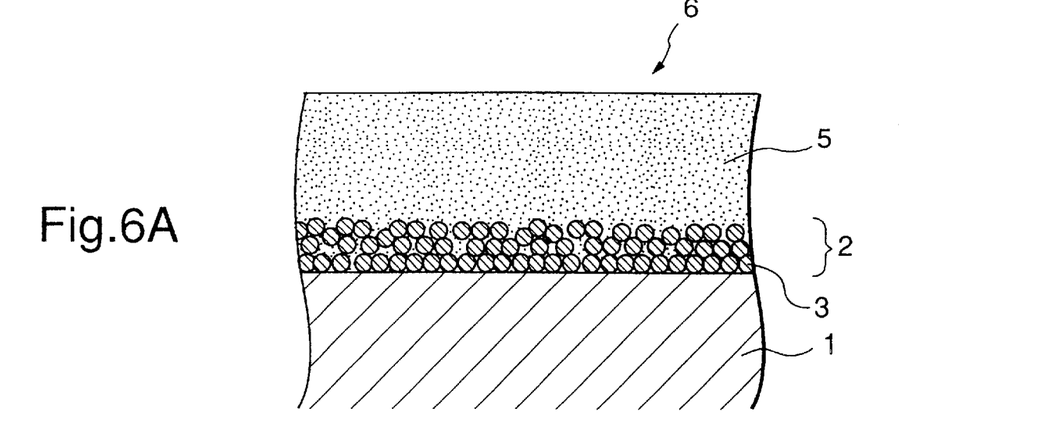
FIG. 6A is a sectional view showing an embodiment of the intermediate layer of the second composite material.
Figure 6B:
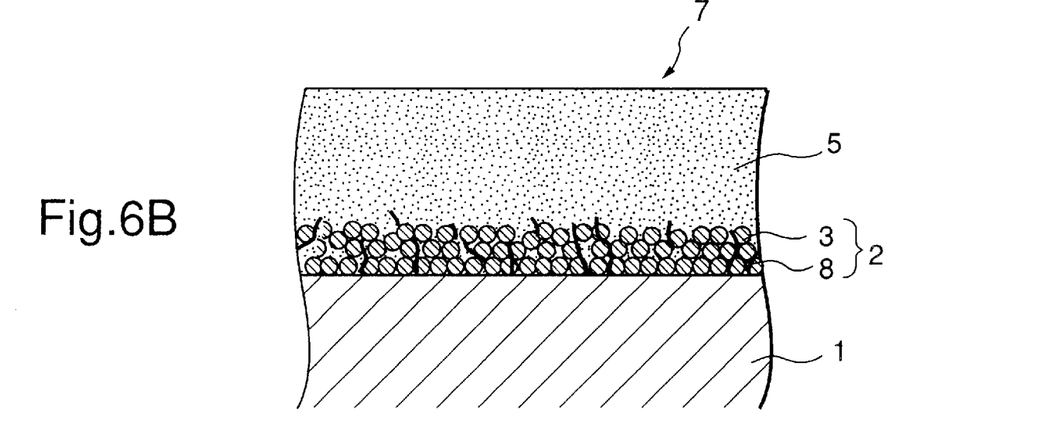
FIG. 6B is a sectional view showing another embodiment of the intermediate layer of the second composite material.

Now, description will be made of a second composite material of the invention with reference to FIG. 6A and FIG. 6B. FIGS. 6A and 6B are sectional views showing schematically a structure of the second composite material of the invention. In the drawing, reference numeral 1 denotes a first member on one side of the composite material, and a porous intermediate layer 2 is bonded to the first member 1. The first member 1 is not limited to a particular material, and various types of metal materials can be used.

The porous intermediate layer 2 which is disposed on the surface of the first member 1 is formed of particulate matters such as spheres 3 in FIG. 6A. And, a porous structural material is formed of a mixture of a fibrous material 8 and the particulate matters of spheres 3 in FIG. 6B.

The structure substance for the porous intermediate layer is not limited to the spheres and fibrous material but may be a cylindrical substance, or may be a mixture thereof. The material for the structure substance is a material which has affinity with the first member 1, namely good bonding ability and reactivity and also a similar coefficient of thermal expansion; and if the first member 1 is a steel material, the same material or an iron-based alloy may be used.

The particulate matters such as spheres 3 or the fibrous material 8 are formed to have a size so that the porous intermediate layer 2 itself can keep a sufficient strength. And, it is preferable that the spheres 3 have an average diameter of 0.001 to 10 mm, and the cylindrical substance has an average diameter of 0.001 to 10 mm and an average aspect ratio of 100 or below. If the average diameter is less than 0.001 mm, it is difficult to charge the second member into the porous intermediate layer 2 and a bond strength is lowered, and a strength of the porous intermediate layer 2 itself might be degraded. And, if the average diameter exceeds 10 mm, a bonded area among the particulate matters and between the particulate matters and the first member is small, and the strength of the porous intermediate layer 2 itself is degraded. The same is applied to the average aspect ratio.

And, the fibrous material 8 is preferably short fibers having an average diameter of 0.001 to 10 mm and an average aspect ratio of 2 to 100. And, the particulate matters or the fibrous material 8 is preferably used together because single use of the particulate matters or the fibrous material 8 is hard to control the hardness and porosity of the porous intermediate layer 2.

Thus, by using a porous body of the particulate matters such as spheres 3 or the fibrous material 8 to make the porous intermediate layer 2, the porosity can be determined large without lowering the strength of the porous intermediate layer 2 itself, and a space structure can be made to have a stereoscopic three-dimensional complex structure. Thus, the amount of a material forming the second member 5 to be impregnated into the porous intermediate layer 2 can be increased, and the impregnated shape can be made complex. Thus, the adhesion and bond strength of the second member 5 can be improved. A preferable porosity of the porous intermediate layer 2 is desired to be about 10 to 90%.

And, the porous intermediate layer 2 is not limited to have a particular thickness, but preferably about 0.001 to 100 mm. And, the porous intermediate layer 2 can be modified in various ways, e.g., its porosity in the thickness direction can be changed.

Figure 6C:
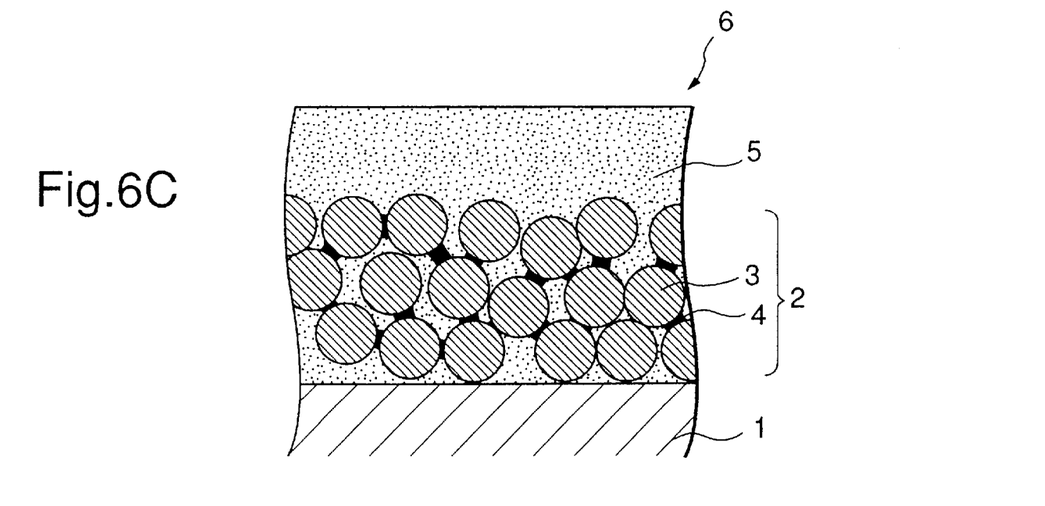
FIG. 6C is an enlarged sectional view showing the intermediate layer shown in FIG. 6A.

To bond the particulate matters such as spheres 3 or the fibrous materials 8 one another or to bond them with the first member 1, a material having a melting point lower than those of materials or a material which can produce such a low-melting point material (hereinafter inclusively called the low-melting point material) 4 is used among them as shown in FIG. 6C. If the low-melting point material 4 is not used, the porous intermediate layer 2 having a sufficient strength is hardly obtained by solid phase bonding because the particulate matters such as spheres 3 have a small contact area. By bonding with the low-melting point material 4 among them, the bond strength can be enhanced.

When the particulate matters such as spheres 3 are made of a metal material, the low-melting point material 4 is a metal material having a lower melting point or a metal material which can produce a low-melting point material (alloy or the like) by reacting with the particulate matters such as spheres 3. The low-melting point material 4 may be a material which functions as a so-called brazing material, and preferably a material which promotes liquid phase sintering among the particulate matters such as spheres 3. And, it is more preferable to use a metal material which can highly enhance a strength of the porous bonding material by producing an alloy among the particulate matters such as spheres 3. Namely, it is preferable that liquid phase sintering is made to bond the particulate matters such as spheres 3 one another or the particulate matters such as spheres 3 and the first member 1. The fibrous materials 8 are also used in the same way.

Specifically, when the particulate matters such as spheres 3 are an iron-based material, there may be used copper, its alloy, aluminum, its alloy or the like. Copper or its alloy forms a liquid phase at a temperature lower than the spheres 3 do, to contribute to the liquid phase sintering among the particulate matters such as spheres 3 and between the particulate matters such as spheres 3 and the first member 1 and also to produce an Fe—Cu alloy on an interface between the copper or copper alloy 4 and the spheres 3, thereby further enhancing the bond strength.

This porous intermediate layer 2 is formed by applying a mixture of the intermediate layer formed of the particulate matters such as spheres 3 or the fibrous materials 8, the low-melting point material 4 and an organic binder to the first member 1, sintering this applied layer at a temperature corresponding to the low-melting point material 4, thereby bonding among the materials forming the intermediate layer and between the intermediate layer-forming materials and the first member with the low-melting point substance 4 between them.

Thus, the porous intermediate layer 2 bonded onto the first member is obtained. And, to change the porosity in the thickness direction of the intermediate layer 2, the composition of the applied layer is changed and applied a plurality of times.

A material different from the first member 1 is used for the second member 5, and it is preferably a resin material, a rubber material or a glass material which itself is low in strength.

For impregnation of such a material into the porous intermediate layer 2, a material in the form of powder or the like for the second member 5 is charged into the porous intermediate layer 2 under pressure and heated to make softening and impregnating or melting and impregnating. And, a method of impregnating a melt or solution of the material forming the second member 5 can also be applied for impregnation.

In the composite material 6 in the embodiment described above, the intermediate layer has the large porosity and the complex structure in the form of three-dimensional network. Thus, when the second member 5 is impregnated into the porous intermediate layer 2, the contact area between the second member 5 and the porous intermediate layer 2 can be determined large, and a good wedge effect can be obtained. In other words, since the porous intermediate layer 2 and the second member 5 impregnated therein are mutually engaged in a complex form against a tensile direction, a high wedge effect is exerted to enhance a bonded state, and the contact area can be increased substantially to improve adhesion properties.

Now, description will be made of one embodiment, that the composite material of the invention is applied to a sliding member, with reference to FIG. 7.

Figure 7:
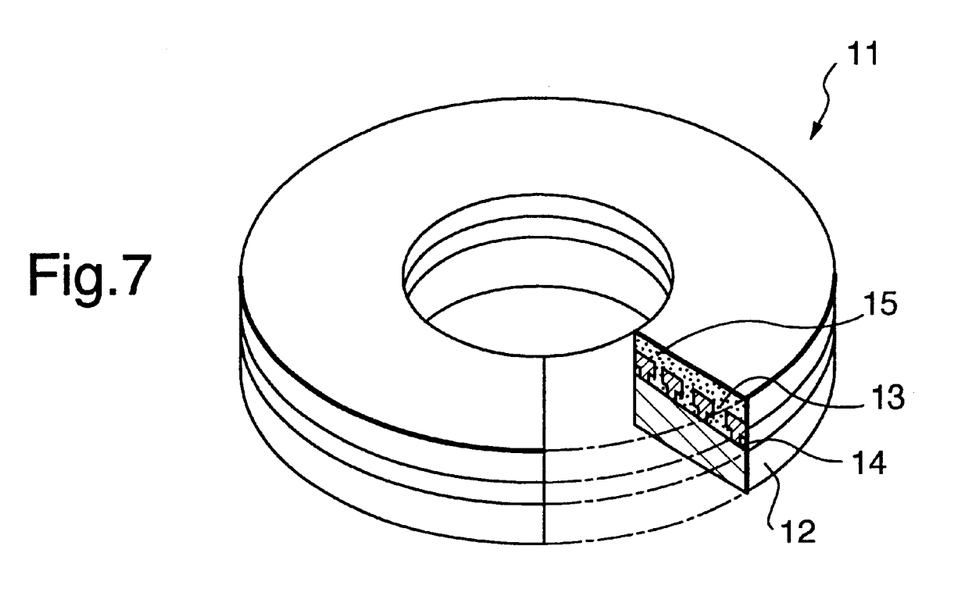
FIG. 7 is a plan view showing one embodiment of applying the composite material of the invention to a sliding member.

A sliding member 11 shown in FIG. 7 is formed by bonding a plate 14 having holes 13 to one side of a sliding member body 12 which is made of a metal material such as various types of alloys to form an intermediate layer and laminating a fluorine-based resin layer 15 to the intermediate layer while charging into the holes 13 of the plate 14 which forms the intermediate plate. The holes 13 have a shape in such that the charged resin layer resist against a tensile stress in a direction perpendicular to its surface (bonded surface). The sliding surface of the sliding member 11 is formed of the fluorine-based resin layer 15. The specific structure of the sliding member 11 is the same as the one described in the embodiment described on the composite material of the invention.

This fluorine-based resin layer 15 is a fluorine-based resin represented by polytetrafluoroethylene (PTFE), and PTFE may be used solely or as a mixture with glass fibers or molybdenum disulfide. And, it is also possible to form a laminated structure which comprises a layer of PTFE only and a layer of PTFE mixed with glass fibers or molybdenum disulfide. In this case, when the single PTFE layer is disposed on the side of the sliding member body 12, PTFE can be charged into the pores 13 with ease, and the sliding surface is good in abrasion resistance due to the low coefficient of friction and a good sliding property of PTFE charged with glass fibers molybdenum disulfide. The single PTFE layer and the filler-charged PTFE layer can be thermally bonded at the same time.

In the sliding member 11 described above, the fluorine-based resin layer 15 made of PTFE or a mixture of PTFE and glass fibers or molybdenum disulfide can be bonded uniformly to the sliding member body 12 with a high strength in the same way as described in the embodiment related to the composite material of the invention. Therefore, reliability of the sliding member 11 and of various devices using it can be enhanced remarkably.

Now, specific embodiments of the invention will be described as follows.

EMBODIMENT 1

As the plate 4 which forms the intermediate layer 2, there were prepared an SS41 steel plate 10 of 200 mm×200 mm×1 mm having through holes 9 with a diameter of 3 mm and formed in a 60-degree staggered arrangement at a pitch of 4 mm (first plate 10), and another SS41 steel plate 8 in the same size having through holes 7 with a diameter of 2 mm and formed in a 60-degree staggered arrangement at a pitch of 4 mm (second plate 8) as shown in FIGS. 2A and 2B.

On the other hand, as the first member 1, an SS41 steel plate of 200 mm×200 mm×20 mm was prepared. And, a pure copper paste which was prepared by mixing pure copper powder having an average particle diameter of 10 $\mu$m and an appropriate amount of an organic binder was applied onto this SS41 steel plate to a thickness of 0.2 mm. The SS41 steel plate 10 having the through holes 9 with a diameter of 3 mm and formed in a 60-degree staggered arrangement was placed on this layer of pure copper paste, the pure copper paste was applied to a thickness of 0.2 mm onto the SS 41 steel plate, and the SS41 steel plate 8 having the through holes 7 with a diameter of 2 mm and formed in a 60-degree staggered arrangement was disposed on the copper paste layer with the centers of the respective through holes 7, 9 aligned.

Then, the first member 1 on which the plates 8, 10 forming the intermediate layer described above were disposed was calcined in a hydrogen gas atmosphere at 1373K for 30 minutes to bond the intermediate layer 4 having the holes 3 in a stepped shape in cross section onto the first member 1 made of the SS41 steel plate.

The first member 1 onto which the intermediate layer 4 was bonded was placed on the bottom of a mold, PTFE powder as a material for the second member 5 (FIG. 1) was charged into the mold under pressure of 40 MPa, and the PTFE was fusion-bonded at 673K for one hour. Thus, the PTFE was laminated to be bonded to the intermediate layer 4, which was formed of the plates having the holes and bonded onto the SS41 steel plate, while also being charged into the intermediate layer to produce a composite material 6 (FIG. 1).

To evaluate the properties of the composite material, its shear strength was measured as follows. Between two first members each had the intermediate layer formed on the surface according to the conditions of the first embodiment, PTFE was held (charged, laminated) as the second member to prepare a sample. The sample was subjected to a shear test in parallel to its bonded faces. It had a good shear strength of 15.5 MPa.

EMBODIMENT 2

As the plate 4 which forms the intermediate layer 2, there was prepared an SS41 steel plate of 200 mm×200 mm×2 mm on which through holes with a diameter of 2 mm were formed in a 60-degree staggered arrangement at a pitch of 4 mm. Holes having a diameter of 3 mm were concentrically formed with these through holes to a depth of 1 mm from one side of the SS41 steel plate.

A composite material was produced in the same way as in the first embodiment except that the above prepared plate was used as the intermediate layer. This composite material was measured for its shear strength in the same way as in the first embodiment. It had a good shear strength of 14.7 MPa.

EMBODIMENT 3

As shown in FIGS. 3A, 3B and 3C, as the plate 4 which forms the intermediate layer, there were prepared two SS41 steel plates 8, 10 of 200 mm×200 mm×1 mm on which through holes 7, 9 with a diameter of 3 mm were formed in a 60-degree staggered arrangement at a pitch of 4 mm. Then, the same pure copper paste as in the first embodiment was applied to a thickness of 0.2 mm to an SS41 steel plate 1 of 200 mm×200 mm×20 mm as a first member 1. One 10 of the two SS41 steel plates was placed on the applied layer of the pure copper paste, and the same pure copper paste was applied to a thickness of 0.2 mm onto the placed SS41 steel plate 1. Then, as shown in FIGS. 3A, 3B and 3C, the other SS41 steel plate 8 having the 60-degree staggered through holes 7 was placed so that the centers of gravity of the positions where these holes are formed, namely respective areas connecting three through holes, were aligned with the center points of the 60-degree staggered through holes 9 of the lower SS41 steel plate 10 to form a bridge structure.

Then, calcination was made under the same conditions as in the first embodiment to bond the intermediate layer 4, having the holes 3 in the bridge structure to the first member 1 made of the SS41 steel plate. Under the same conditions as in the first embodiment, PTFE was laminated to be bonded to the intermediate layer 4 while also being charged into the holes of the intermediate layer to produce a composite material. This composite material was measured for its shear strength in the same way as in the first embodiment. It had a good shear strength of 15.3 MPa.

COMPARATIVE EMBODIMENT 1

A composite material was produced in the same way as in the first embodiment except that an SS41 steel plate of 200 mm×200 mm×2 mm on which through holes with a diameter of 3 mm were formed in a 60-degree staggered arrangement at a pitch of 4 mm was used as the plate 4 forming the intermediate layer 2. This composite material was measured for its shear strength in the same way as in the first embodiment. It had a low shear strength of 5.0 MPa because the PTFE charged into the holes of the intermediate layer was separated and pulled out of the holes.

EMBODIMENT 4

As the first member, there was prepared an S45C carbon steel circular plate having a diameter of 100 mm and a height of 10 mm. A mixture of carbon steel balls having an average diameter of 0.5 mm as intermediate component substance, pure copper balls having an average diameter of 0.3 mm as low-melting point substance and an appropriate amount of an organic binder was applied to the S45C carbon steel circular plate. The carbon steel balls and the pure copper balls were mixed at a ratio of 10:1 by weight. And, the mixture was applied to a thickness of 3 mm.

The S45C carbon steel circular plate on which a layer of the applied mixture was formed was calcined in a vacuum of $1.33 \times 10^{-2}$ Pa at 1373K for 2 hours to form a porous layer on the S45C carbon steel circular plate. In this porous intermediate layer, bonding among the carbon steel balls and between the carbon steel balls and the S45C carbon steel circular plate was good by virtue of Cu and Cu—Fe alloy. The intermediate layer had a great number of transmission holes and strength. And, its porosity was about 20%.

The carbon steel circular plate onto which the porous intermediate layer was formed was placed on the bottom of a mold, PTFE-based powder as a material for the second member was charged into the mold and impregnated under pressure of 40 MPa, and the PTFE-based powder was fusion bonded at 673K for two hours. Thus, the PTFE-based powder was laminated to be bonded to the porous intermediate layer, which was formed of a porous bonded substance of the carbon steel balls bonded to the carbon steel circular plate, while also being charged into the porous intermediate layer to produce a composite material.

To evaluate the properties of the composite material, its shear strength was measured as follows. Between two first members each had the porous intermediate layer formed on the surface according to the conditions of the fourth embodiment, PTFE-based powder was held as the second member to prepare a sample. The sample was pulled in a direction parallel to its bonded faces for a shear test It had a good shear strength of 7.0 MPa.

EMBODIMENT 5

As the first member, there was prepared an S45C carbon steel circular plate having a diameter of 100 mm and a height of 10 mm. A mixture of carbon steel balls having an average diameter of 0.5 mm and stainless steel wires having a diameter of 0.5 mm and an average length of 10 mm as intermediate component substance, pure copper balls having an average diameter of 0.3 mm as low-melting point substance and an appropriate amount of an organic binder was applied to the S45C carbon steel circular plate. The carbon steel balls and the stainless steel wires were mixed at a ratio of 10:2 by weight. And, they were mixed with the pure copper balls at a ratio of 10:1 by weight. The mixture was applied to a thickness of 3 mm.

The S45C carbon steel circular plate on which a layer of the applied mixture was formed was calcined in a vacuum of $1.33 \times 10^{-2}$ Pa at 1373K for 2 hours to form a porous layer on the S45C carbon steel circular plate. In this porous intermediate layer, bonding among the carbon steel balls and between the carbon steel balls and the stainless steel wires and between them and the S45C carbon steel circular plate was good by virtue of Cu and Cu—Fe alloy. The intermediate layer had a great number of transmission holes and strength. And, its porosity was about 35%.

The carbon steel circular plate onto which the porous intermediate layer was formed was placed on the bottom of a mold, PTFE-based powder as a material for the second member was charged into the mold and impregnated under pressure of 40 MPa, and the PTFE-based powder was fusion bonded at 673K for two hours. Thus, the PTFE-based powder was laminated to be bonded to the porous intermediate layer, which was formed of a porous bonded substance of the carbon steel balls and the stainless steel wires bonded to the carbon steel circular plate, while also being charged into the porous intermediate layer to produce a composite material.

The composite material was pulled in a direction parallel to its bonded faces for a shear test in the same way as in the fifth embodiment. It had a good shear strength of 7.5 MPa.

EMBODIMENT 6

As the first member, there was prepared an SS41 steel circular plate having a diameter of 100 mm and a height of 10 mm. A mixture of stainless steel wires having an average diameter of 0.5 mm and an average length of 10 mm as intermediate component substance, pure Al balls having an average diameter of 0.1 mm as low-melting point substance and an appropriate amount of an organic binder was applied to the SS41 steel circular plate. The stainless steel wires and the pure Al balls were mixed at a ratio of 2:1 by weight. The mixture was applied to a thickness of 3 mm.

The SS41 steel circular plate on which a layer of the applied mixture was formed was calcined in a hydrogen gas atmosphere at 975K for 2 hours to form a porous intermediate layer on the SS41 steel circular plate. In this porous intermediate layer, bonding among the stainless steel wires and between the stainless steel wires and the SS41 steel circular plate was good by virtue of Al and Al—Fe alloy. And, its porosity was about 40%.

The SS41 steel circular plate onto which the porous intermediate layer was formed was placed on the bottom of a mold, PTFE-based powder containing 15% by weight of glass fibers as a material for the second member was charged into the mold and impregnated under pressure of 40 MPa, and the PTFE-based powder was fusion bonded at 673K for two hours. Thus, the PTFE-based material was laminated to be bonded to the porous intermediate layer, which was formed of a porous bonded substance of the stainless steel wires bonded to the SS41 steel circular plate, while also being charged into the porous intermediate layer to produce a composite material.

The composite material was pulled in a direction parallel to its bonded faces for a shear test. It had a good shear strength of 8.0 MPa.

EMBODIMENT 7

As the first member, there was prepared a permalloy plate (78.5 wt % of Ni, 0.3 wt % of Mn, and a rest of Fe) having a width of 10 mm, a length of 100 mm and a thickness of 1 mm. A mixture of SUS416 stainless steel wires having a diameter of 0.1 mm and an average length of 3 mm as intermediate component substance, Cu powder having an average particle diameter of 10 μm as low-melting point substance and an appropriate amount of a binder was applied to the permalloy plate. The stainless steel wires and the Cu powder were mixed at a ratio of 10:1 by weight. The mixture was applied to a thickness of 0.5 mm.

The permalloy plate on which a layer of the applied mixture was formed was calcined in a hydrogen gas atmosphere at 1373K for two hours to form a porous intermediate layer on the permalloy plate. In this porous intermediate layer, bonding among the stainless steel wires and between the stainless steel wires and the permalloy plate was good by virtue of Cu and Cu—Fe alloy. And, its porosity was about 40%.

Borosilicate glass frit for enamelling and having an average particle diameter of about 10 μm as material for the second member was applied to the permalloy plate onto which the porous intermediate layer was formed, and the borosilicate glass was melt hardened at 1123K for five minutes. The borosilicate glass was laminated to be bonded to the permalloy plate while also being charged into the porous intermediate layer of the stainless steel wires to produce a composite material.

The composite material was subjected to a 90-degree bending test (a radius of curvature R=20 mm) but had no peeling.

EMBODIMENT 8

As the first member, there was prepared an SS41 steel plate having a width of 10 mm, a length of 100 mm and a thickness of 1 mm. A mixture of S45C carbon steel balls having an average diameter of 0.1 mm as intermediate component substance, pure copper powder having an average diameter of 10 μm as low-melting point substance and an appropriate amount of an organic binder was applied to the SS41 steel plate. The carbon steel balls and the pure copper powder were mixed at a ratio of 10:1 by weight. And, the mixture was applied to a thickness of 1 mm. On this first applied layer, a mixture of S45C carbon steel balls having an average diameter of 0.1 mm and SUS416 stainless steel wires having a diameter of 0.1 mm and an average length of 3 mm as intermediate component substance, pure Cu powder having an average particle diameter of 10 μm as low-melting point substance and an appropriate amount of an organic binder was applied to a thickness of 1 mm to form a second applied layer. The carbon steel balls and the stainless steel wires were mixed at a ratio of 1:1 by weight, and they were mixed with the pure copper powder at a ratio of 10:1 by weight.

Then, the SS41 steel plate on which the applied layer in the two-layered structure was formed was calcined in a hydrogen gas atmosphere at 1373K for two hours to form a porous intermediate layer on the SS41 steel plate. In this porous intermediate layer, bonding among the carbon steel balls, between the carbon steel balls and the SS41 steel plate and between the carbon steel balls and the stainless steel wires was good by virtue of Cu and Cu—Fe alloy. And, its porosity was about 20% at a position corresponding to the first applied layer and about 35% at a position corresponding to the second applied layer.

The SS41 steel plate onto which the porous intermediate layer in the two-layered structure was formed was placed on the bottom of a mold; an epoxy resin powder containing 10% by weight of carbon fibers was charged as material for the second member into the mold, impregnated under pressure of 20 MPa while being heated at 473K, and impregnation hardened for the epoxy resin. Thus, the epoxy resin containing carbon fibers was laminated to be bonded to the porous intermediate layer in the two-layered structure formed on the SS41 steel plate while also being impregnated into the porous intermediate layer of the stainless steel wires to produce a composite material.

The composite material was subjected to a 90-degree bending test (a radius of curvature R=20 mm) but had no peeling.

As described above, the composite material of the present invention can have an enhanced bond strength between different types of materials without deteriorating the resin material or the strength of the composite material itself. Therefore, the present invention can provide a reliable composite material which is formed of different materials. And, a method for producing the composite material of the present invention can produce a composite material which is formed of different materials.

What is claimed is:

1. A composite material comprising:
   a first member formed of a first material, the first member having at least one bonding surface;
   a perforated intermediate plate disposed on the first member and unitarily bonded in advance to the bonding surface of the first member with a bonding material having a lower melting point than the intermediate plate, the intermediate plate being a bonded metal plate comprising a first perforated metal plate and a second perforated metal plate each having a plurality of holes, which are orderly formed such that each of holes of the first perforated metal plate communicates with at least one hole of the second perforated metal plate through a stepped portion; and
   a second member formed on the perforated intermediate plate and formed of a second material different from the first member,
   wherein the second member has a charged portion which is formed by charging the second material into the holes of the bonded metal plate of the intermediate plate to bond said second member to said first member and to form charged portions each having a stepped shape conforming with a shape of the holes of the bonded metal plate such that the second member resists perpendicular tensile stresses applied to the bonding surface of the composite material due to a wedge effect of the charged portion of the second member.

2. The composite material as set forth in claim 1, wherein each of the holes of the bonded metal plate has a first opening on the side of the first member and a second opening on the side of the second member, the second opening having substantially the same size as the first opening and being overlapped with a group of first openings to form a stepped portion.

3. The composite material as set forth in claim 1, wherein each of the holes of the bonded plate has a first opening on the side of the first member and a second opening on the side of the second member, the second opening having an area smaller that the first opening.

4. A composite material comprising:
   a first member formed of a first material, the first member having at least one bonding surface;
   a perforated intermediate plate having a plurality of through holes, the perforated intermediate plate being unitarily bonded in advance to the bonding surface of the first member with a bonding material having a lower melting point than the intermediate plate, and
   a second member formed on the perforated intermediate plate and formed of a second material different from the first member,
   wherein the perforated intermediate plate is a bonded plate comprising a first plate, which has first holes each having a first cross section and is disposed on the side of the second member, and a second plate, which has second holes each having a second cross section larger than the first cross section and is bonded to the bonding surface of the first member, and wherein the first and second plates are bonded such that the second holes and the first holes are aligned to form the plurality of through holes, and
   wherein the second member is charged into the first and second holes of the bonding plate such that the second member resists perpendicular tensile stresses applied to the bonding surface of the composite material due to a wedge effect of the second member charged into the second holes.

5. A composite material comprising:
   a first member formed of a first material, the first member having at least one bonding surface;
   an intermediate plate having a plurality of through holes each having a stepped portion, the intermediate plate being unitarily bonded in advance to the bonding surface of the first member with a bonding material having a lower melting point than the intermediate plate, and
   a second member formed on the intermediate plate and formed of a second material different from the first member,
   wherein the intermediate plate is a bonding plate comprising a first plate having first holes and a second plate having second holes with a size substantially the same as that of the first holes, and wherein the first and second plates are bonded such that each of the first holes partially overlaps multiple second holes to form the through holes each having a stepped portion, and
   wherein the second member is charged into the first and second holes of the bonding plate such that the second member resists perpendicular tensile stresses applied to the bonding surface of the composite material due to a wedge effect of the second member.

6. The composite material as set forth in claim 1, claim 4 or claim 5, wherein the first material is a metal, and the second material is selected from the group consisting of a resin material, a rubber material, and a glass material, and wherein the second material has a hardening temperature lower than the melting point of the metal.

7. A sliding member comprising:
   a sliding member body formed of a metal, the sliding member body having at least one bonding surface;
   an intermediate metal plate having a plurality of through holes and unitarily bonded on the bonding surface of the sliding member body in advance with a metal bonding material having a lower melting point than that of the intermediate metal plate, wherein the intermediate metal plate comprises a first metal plate that has first holes each having a first cross section and a second metal plate that has second holes each having a second cross section larger than the first cross section and is bonded to the bonding surface of the sliding member, the first and second metal plates being bonded such that the second holes and the first holes are aligned to form the plurality of through holes; and
   a fluorine-base resin layer formed on the intermediate metal plate, the resin layer having charged portions into the holes of the intermediate metal plate to bond said fluorine-base resin layer to said sliding member body and wherein the fluorine-base resin layer resists perpendicular tensile stresses applied to the bonding surface of the sliding member due to a wedge effect of the charged portions.

8. The composite material as set forth in claim 1, wherein the intermediate plate comprises a material having an approximate coefficient of thermal expansion which is substantially the same as that of the first material.

9. The composite material as set forth in claim 8, wherein the first material comprises steel and the intermediate plate is formed of a metal selected from the group consisting of steel and an iron-based alloy.

10. A sliding member comprising:

a sliding member body formed of a metal, the sliding member body having at least one bonding surface;

an intermediate metal plate having a plurality of through holes and unitarily bonded to the bonding surface of the sliding member body in advance with a metal bonding material having a lower melting point than that of the intermediate metal plate, wherein the intermediate metal plate comprises a first metal plate having a plurality of first holes and a second metal plate having a plurality of second holes each having substantially the same cross section as that of the first holes, and the first and second metal plates being bonded such that each of the first holes of the first metal plate overlaps with multiple second holes of the second metal plate to form the through holes, and a fluorine-base resin layer formed on the intermediate metal plate, the resin layer having charged portions into the through holes of the intermediate metal plate to bond said fluorine-base resin layer to said sliding member body and wherein the fluorine-base resin layer resists perpendicular tensile stresses applied to a bonding surface of the sliding member body due to a wedge effect of the charged portions in the second holes.

11. The composite material as set forth in claim 1, wherein each of the first and second perforated metal plates is a punching plate formed by punching a metal plate.

12. The composite material as set forth in claim 4, wherein each of the first and second plates is a punching metal plate having substantially planar surfaces and formed by punching a metal plate.

13. The composite material as set forth in claim 5, wherein each of the first and second plates is a punching metal plate having substantially planar surfaces and formed by punching a metal plate.

* * * * *